May 29, 1934.  C. L. GIEZENTANNER  1,960,738
WEED GUN
Filed Jan. 21, 1931   2 Sheets-Sheet 2
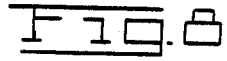
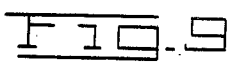
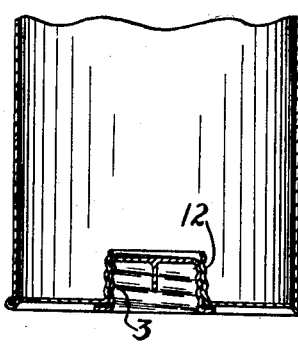
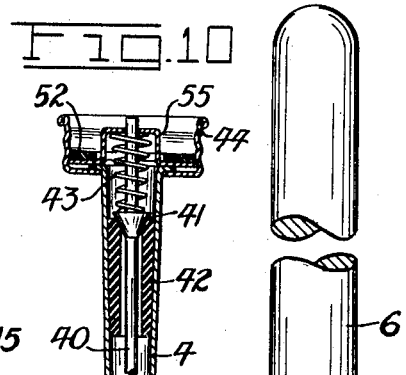
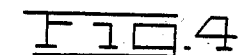
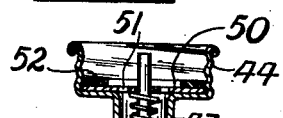
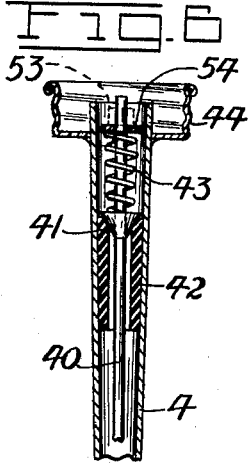
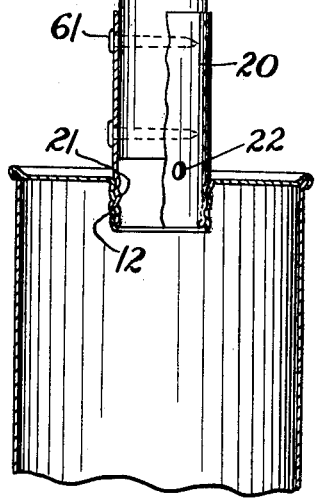
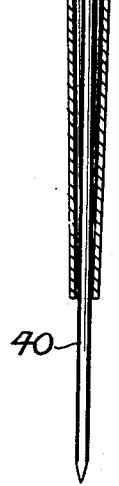
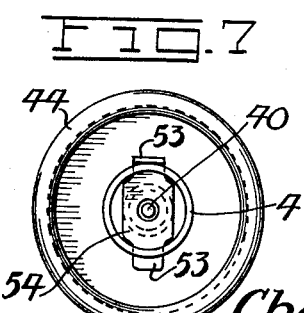
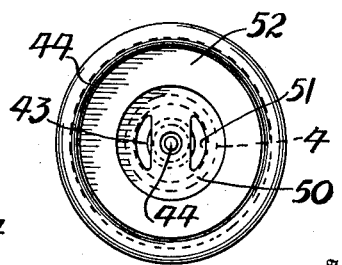
Inventor
Charles L. Giezentanner
By Charles L. Reynolds
Attorney Patented May 29, 1934

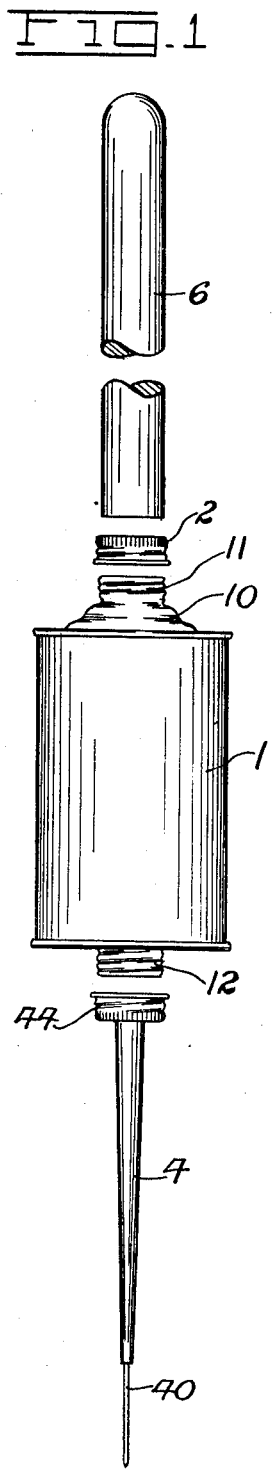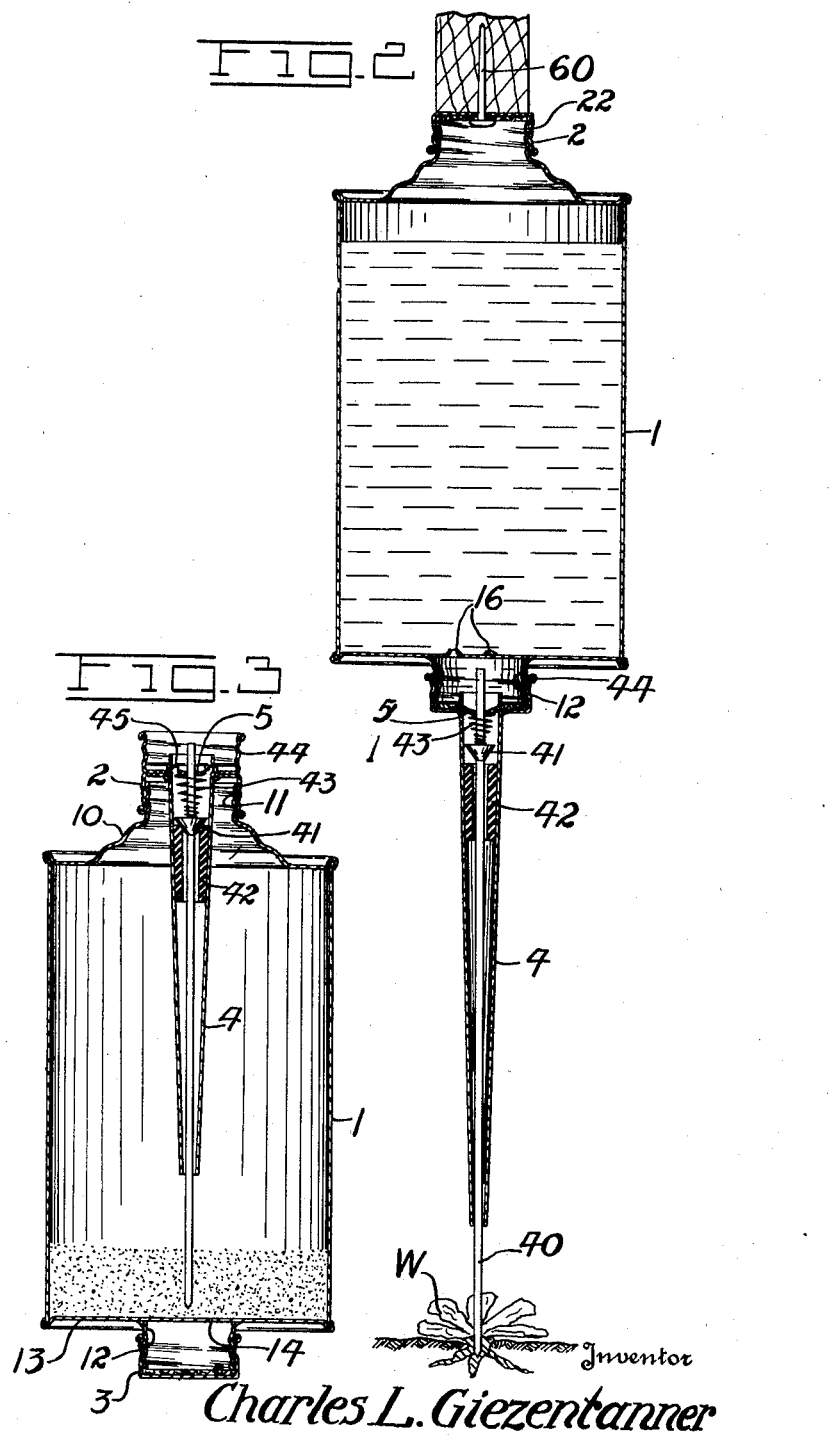

1,960,738

UNITED STATES PATENT OFFICE 1,960,738

WEED GUN

Charles L. Giezentanner, Montesano, Wash., assignor to Weed Destroyer Co., Inc., Aberdeen, Wash., a corporation of Washington Application January 21, 1931, Serial No. 510,115

12 Claims. (Cl. 47—49)

My invention relates to an improvement in weed guns, and it is one of the principal objects of my invention to provide a weed gun of extremely cheap and simple construction, so that the container or reservoir portion thereof may be supplied with a liquid, and a valve-controlled spout may be attached thereto, a handle being also attachable if desired, and the container being thrown away when empty, to be replaced by another like container.

It is a further object to provide means for closing the apertures in such cans at times when the weed gun is not in use, and to provide means whereby the spout and handle, if one is used, may be employed in association or interchangeably with the caps for closing the apertures, both the vent and the discharge aperture from the container.

A further object is to provide a simple valve means and seat therefor, which will enable such a spout to be manufactured cheaply, and which will operate efficiently.

A further object of my invention is to provide the container and weed gun, of the general character indicated, which can be made compact for shipment.

My invention comprises the novel parts and the novel combination and arrangement thereof as shown in the accompanying drawings, described in the specification, and as will be more particularly pointed out by the claims which terminate the same.

In the accompanying drawings my invention is shown in forms which are now preferred by me.

Figure 1 is a side elevation of one form of my weed gun, parts being shown separated.

Figure 2 is an axial section through my weed gun assembled and in operation.

Figure 3 is a sectional view of a slightly modified form shown in condition for shipment.

Figure 4 is an axial section through a modified form of spout.

Figure 5 is an inside end view of the spout construction shown in Figure 4.

Figure 6 is an axial section and Figure 7 an end view of a further modified form of spout.

Figure 8 is an axial section through a container in condition for shipment, and Figure 9 is a similar sectional view of the same form of container set up in condition for use.

Figure 10 is a detail section of a further modified spout and cap.

A weed-destroying agent may be supplied in the form of a powder to be dissolved, or in the form of the solution, and in either form it may be supplied and shipped in a container or reservoir 1, which in effect is an ordinary harness-oil can, or a slight modification thereof. By using such a container its cost becomes negligible. At one end such a can may be provided with a corrugated end 10, terminating in a threaded collar 11, defining the aperture, and ordinarily closed by a cap 2. To adapt such a container to my uses, it may conveniently be provided with a second threaded collar 12 secured in the opposite end 13, which collar is adapted to communicate with the interior of the container. For shipping purposes, such communication may be prevented by a puncturable portion 14 of the can end 13, which in effect is a diaphragm closing the can at this point. A cap 3 may be provided, which is to be threaded upon the collar 12 between intervals of use of the weed gun, and will prevent leakage of the solution through the collar 12 after the diaphragm 14 has been punctured on first use of the gun. The collar 12 may project from the surface of the can end 13, as seen in Figures 1, 2 and 3, or it may be recessed thereinto, as shown in Figures 8 and 9. When recessed, it permits the can to be supported upon its seamed edge at 15.

A discharge spout is provided for use with such a fluid reservoir, the same comprising a preferably tapering hollow stem or tube 4, through which extends a rod or skewer 40, upon which rod is a conical valve 41 seating upon a plug or sleeve 42, which is received within the spout 4 near its base. I prefer that the valve 41 be of metal, formed upon the rod 40, and that the sleeve 42 be of rubber, though these conditions may be reversed, as has been indicated in Figure 4. To urge the valve to its seat in the end of the sleeve 42, I may provide a spring 43 surrounding the inner end of the stem 40, and backed by a bracket or keeper engaged within the base of the spout, which keeper may take various forms, and which is generally indicated at 5.

As seen in Figures 2 and 3, the keeper 5 comprises a strip of metal, which does not close the base of the spout 4, but which is received in a groove 45 formed at the base of the spout 4. This groove may be crimped, and may assist in retaining the base of the spout within the head of a cap or like means indicated generally at 44, by means of which the spout is received upon either a collar 11 or the collar 12, interchangeably with the cap 2 or 3. In Figure 3, however, the threaded cap 44 has been shown as reversed with respect to a cap 2, which in effect is formed as a part of the cap 44 but reversed therefrom, both caps being secured to and around the base of the spout, so that the spout 4 may project within the container 1 to make the package more compact for shipment. For use the spout is withdrawn from the container and is reversed and secured in place by means of an attached cap 44 threading upon the collar 11, or upon the collar 12, in which latter case the diaphragm 14 will have been punctured to leave discharge openings, as has been indicated at 16 in Figure 2.

Since the tube 4 would ordinarily be reasonably short, and the container 1 is not of great length, it may be desirable to employ a handle 6 to enable the weed gun to be used by a person while standing in an upright position. Such a handle may be a piece of broomstick or a like member, or may be specially prepared for the purpose. A piece of broom handle, however, may be secured to the removable cap 2 by such means as a nail or nails, indicated at 60 in Figure 2, and thus attached, with a vent 22 punched in the cap 2 to admit air to the upper portion of the container 1, and the tube 4 with its cap 44 being secured upon the sleeve 12, the point of the skewer 40 may be pressed into a weed, as indicated at W in Figure 2, which action will unseat the valve 41 and allow a portion of the liquid to run down the stem 40 and to enter the bruise or puncture in the weed W. A liquid of characteristics which are poisonous to weeds, employed thus, will accomplish the death of the weed without the necessity of its being removed.

Instead of securing a cap 2 upon the end of the handle, a ferrule 20 may be provided, this being threaded at its lower end, as indicated at 21, to be received in or over a collar such as the collar 12 (see Figure 9). This ferrule may be applied with the handle, or may be removable from the handle. As shown it is permanently secured by nails, indicated at 61. The handle may stop short of the end of the ferrule, whereby a hole 22 is left as a vent.

As has been stated, the bracket or keeper 5 may take various forms. In Figure 4 it is shown in the form of a disc 50, received within the base of the cap 44, which cap is shown in this modification as a continuation of the spout 4, and having apertures 51 through which the liquid may pass. A central aperture permits the inner end of the rod 40 to project through the disc 50. It may be retained in place by a retainer ring, such as the rubber ring 52, which grips the inside of the cap 44 to prevent accidental removal of the disc 50.

In Figure 6 the base of the tube 4 is shown projecting within the cap 44 which receives the base of the tube, and this projecting end is provided with opposite apertures, through which pass tabs 53 at the end of a keeper plate 54. These ends may then be bent over or otherwise secured in place.

The keeper 55 in Figure 10 is in the form of a bridge bracket, whereby the resilience of the metal tends to hold its ends against the inside walls of the cap 44, although a washer or gasket 52 additionally holds it in place. In this form the base of the spout is disposed between the cap 44 and the keeper 55. This construction also enables the spring 43 and valve 41 to be located nearer the base of the tube 4, conserving space, and permitting the spout to be made shorter than in some other forms.

Such a weed gun can be supplied at extremely low cost, and as fresh supplies of liquid must be purchased from time to time, in any event, it is very convenient to detach the handle and the spout from an exhausted container and to attach them to a fresh container, whereupon it is again ready for use, and the empty container can be thrown away, or it can be refilled and used again.

What I claim as my invention is:

1. A tapering spout unit adapted to be removably attached to the reservoir of a weed gun, including a tapering spout, a sleeve of rubber permanently wedged therein, a rod extending through the sleeve and through the spout, and projecting at the latter's discharge end, a valve formed on said rod and positioned to seat upon said rubber sleeve, a spring behind said valve, and a member received and secured in the base of said spout to retain the rod, valve and spring within the spout.

2. A spout unit adapted for attachment to weed guns, including a tapering spout, a sleeve of rubber permanently wedged therein, a rod extending through the sleeve and through the spout, and projecting at the latter's discharge end, a valve formed on said rod and positioned to seat upon said rubber sleeve, a spring behind said valve, a member received and secured in the base of said spout to retain the rod, a valve and spring within the spout, and a threaded cap formed on and encircling the base of said spout, whereby the same may be removably secured upon a container.

3. A tapering spout for weed guns, a sleeve of rubber received therein, a rod extending through the spout and projecting at its discharge end, a valve formed on said rod and positioned to seat upon said rubber sleeve, a spring behind said valve, said spout being circumferentially grooved at its base, an apertured keeper fitting about the inner end of the stem, inwardly of said spring, and received in said groove, and means for securing said spout upon a container.

4. In a device of the class described, a reservoir, a hollow stem removably secured to said reservoir and having one end communicating at all times with the inside of the same when attached thereto, a valve-seat formed in the end of the said stem that communicates with the inside of said reservoir, a pointed rod, adapted to pierce a plant, slidably mounted in said stem and extending a substantial distance beyond the forward end of said stem, a valve-head formed on the inner end of said rod capable of engaging said valve-seat, a bracket operatively connected to said stem at all times, and a coil spring having one end engaging said bracket and its other end engaging said valve-head.

5. In a device of the class described, a reservoir, a hollow tapered, elongated stem removably secured to said reservoir and communicating with the inside of same, a pointed rod, adapted to pierce a plant, extending through said hollow elongated stem and terminating at a point a considerable distance beyond said stem, and valve means carried by said rod to control the flow of a fluid from said reservoir to said stem, including a valve seat comprising a tapered sleeve secured in and extending a considerable distance lengthwise of said tapered stem.

6. In a plant-killing device, the combination of a fluid reservoir, a cup-shaped valve body communicating at all times with said reservoir and provided with a valve seat formed therein, and a valve opening in the bottom of said reservoir, a valve with a downwardly extending pointed rod, adapted to pierce a plant, closing said valve opening, and a spiral compression spring mounted above said valve and seating on the upper surface thereof, thus urging the same to a closed position, said spring being totally enclosed within said cup-shaped body and supported externally thereby.

7. A device of the class described comprising a container having a discharge opening in its bottom, a valve for controlling the opening, a tube removably supported below the lower end of the container and receiving the liquid from the same, a plug extending lengthwise of and permanently fixed in the lower end of the tube and constructed to permit the liquid to pass from said container through the same when the valve is in the open position, and a pointed member projecting from the lower end of the plug for penetrating portions of a plant to permit liquid to enter the plant.

8. A weed gun comprising in combination, a container, a spout, and a handle, the container having engaging means at an end thereof, and means on said handle adapted for engagement interchangeably with the spout, with the engaging means on an end of the container.

9. In a weed gun, in combination, a container having a discharge aperture, a tapered spout having means at its base for removably securing the same upon the container in registry with said aperture, a sleeve tapered complementally to said spout and frictionally held therein, a valve seat at the upper end of said sleeve, a rod extending through said spout and through the sleeve, and a valve formed on said rod adapted to seat on said valve seat to regulate communication between the container and the spout.

10. In a device of the class described, a reservoir, a hollow stem, a cap fixed to and encircling the base of said stem and threaded to engage complemental threads on said reservoir, the base of said stem being in communication with the inside of said reservoir, a valve seat formed in the base of said stem, a pointed rod, adapted to pierce a plant, slidably mounted in said stem, a valve head formed at the inner end of said rod capable of engaging said valve seat, a bracket secured to said cap, and a coil spring having one end engaging said bracket and its other end engaging said valve head.

11. In a plant-killing device, the combination of a fluid reservoir, a cup-shaped valve body provided with a valve seat formed therein, and a valve opening in the bottom of said reservoir, a valve with a downwardly extending pointed rod, adapted to pierce a plant closing said valve opening, said cup-shaped valve body including a tube and a member secured thereto at its upper end affording constant communication between the reservoir and the upper end of the valve body, and a spiral compression spring extending between said member and said valve and urging the same to a closed position.

12. A device of the class described comprising a container having a discharge opening in its bottom, a valve for controlling the opening, a tube supported below the lower end of the container, a threaded cap associated with said tube and adapted for securement to said container, a rubber plug extending a considerable distance lengthwise of said tube and frictionally secured therein, and apertured to permit liquid from the container to flow therethrough when the valve is in the open position, and a pointed member projecting from the lower end of the plug for penetrating portions of a plant to permit liquid to enter the plant.

CHARLES L. GIEZENTANNER.